(12) United States Patent
Davis

(10) Patent No.: US 9,217,422 B2
(45) Date of Patent: Dec. 22, 2015

(54) KINETIC ENERGY TRANSFER SYSTEM AND METHODS

(71) Applicant: Lud Davis, Nacogdoches, TX (US)

(72) Inventor: Lud Davis, Nacogdoches, TX (US)

( * ) Notice: Subject to any disclaimer, the term of this patent is extended or adjusted under 35 U.S.C. 154(b) by 374 days.

(21) Appl. No.: 13/766,766

(22) Filed: Feb. 13, 2013

(65) Prior Publication Data

US 2013/0205764 A1   Aug. 15, 2013

Related U.S. Application Data

(60) Provisional application No. 61/598,152, filed on Feb. 13, 2012.

(51) Int. Cl.
   *F03G 7/04* (2006.01)

(52) U.S. Cl.
   CPC .. *F03G 7/04* (2013.01); *Y02B 10/30* (2013.01)

(58) Field of Classification Search
   CPC ............................... Y02E 60/15; Y02E 70/30
   USPC ........................................................... 60/398
   See application file for complete search history.

(56) References Cited

U.S. PATENT DOCUMENTS

| | | | | |
|---|---|---|---|---|
| 3,523,192 A * | 8/1970 | Lang | | 290/52 |
| 3,538,340 A * | 11/1970 | Lang | | 290/52 |
| 3,985,472 A * | 10/1976 | Virtue et al. | | 417/216 |
| 3,996,741 A * | 12/1976 | Herberg | | 60/398 |
| 3,998,053 A * | 12/1976 | Johnson | | 60/422 |
| 4,345,436 A * | 8/1982 | Johnson | | 60/421 |
| 4,691,524 A * | 9/1987 | Holscher | | 60/652 |
| 5,263,322 A * | 11/1993 | Molini | | 60/398 |
| 5,318,382 A * | 6/1994 | Cahill | | 405/129.4 |
| 5,515,679 A * | 5/1996 | Shulman | | 60/641.2 |
| 5,685,155 A * | 11/1997 | Brown et al. | | 60/698 |
| 7,254,944 B1 * | 8/2007 | Goetzinger et al. | | 60/398 |
| 7,281,371 B1 * | 10/2007 | Heidenreich et al. | | 60/398 |
| 7,608,935 B2 * | 10/2009 | Scherzer | | 290/43 |
| 7,615,882 B2 * | 11/2009 | Riley | | F03B 13/06 290/43 |
| 7,757,765 B2 * | 7/2010 | Hilleary et al. | | 166/292 |
| 8,763,387 B2 * | 7/2014 | Schmidt | | 60/398 |

* cited by examiner

*Primary Examiner* — Thomas E Lazo

(74) *Attorney, Agent, or Firm* — Sutton McAughan Deaver PLLC

(57) ABSTRACT

Systems, methods and apparatus for subjecting high-pressure fluids to a fluid flow assembly that generates or extracts work/energy using a work producing machine. Kinetic energy from the work producing machine is converted to electricity using a generator or similar apparatus.

27 Claims, 3 Drawing Sheets

KINETIC ENERGY TRANSFER SYSTEM AND METHODS

CROSS REFERENCE TO RELATED APPLICATIONS

This application claims priority to U.S. Provisional Patent Application Ser. No. 61/598,152, filed Feb. 13, 2012, the contents of which are incorporated herein by reference in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to kinetic energy recovery systems, and more specifically, are related to the recovery of kinetic energy from natural gas production well heads or geothermal sources.

2. Description of the Related Art

Conventional systems for generating electricity for consumption and use by the public include nuclear power, fossil fuel powered steam generation plants and hydroelectric power. Operation and maintenance of these systems is expensive and utilizes significant natural resources and in some cases results in excessive pollution, either through hydrocarbon combustion or spent nuclear fuel rod disposal. Oil is often considered to be a non-renewable source of power, which leaves non-petroleum producing countries at the mercy of those which produce petroleum.

Nuclear power, while useful, also has its problems. Currently, nuclear material is mined from the earth, refined and then utilized in a nuclear power plant. Sufficient amounts of Uranium-235 and/or plutonium are confined to a small space, often in the presence of a neutron moderator. The subsequent reaction produces heat which is converted to kinetic energy by means of a steam turbine and then a generator for electricity production. Nuclear power currently provides about 17% of the United States electricity and 7% of global energy. The cost for bringing a nuclear power plant on line, at last estimate, is approximately $10-30Billion.

Therefore, there is a need in the art for systems and methods for generating clean electrical power cheaply without relying upon the import of petroleum materials or building of multi-billion dollar power plants.

Wellhead gas has been considered to be a potential, partial solution to the issue. Wellhead gas is generally comprised of a mixture of a number of gases and is vapors, including nitrogen ($N_2$), carbon dioxide ($CO_2$), methane ($CH_4$), ethane ($C_2H_6$), propane ($C_3H_8$), iso-butane ($C_4H_{10}$), n-butane ($C_4H_{10}$) and iso-pentane ($C_5H_{12}$); and small quantities of entrained water, all obtained as by-products of gas and oil field production operations at the well heads. Wellhead gas is particularly rich in methane gas (75-95mol %), includes appreciable quantities of ethane (3-8mol %) and propane (0.5-5mol %), and as a moisture-free mixture has a heating value of 1400-2000Btu per cubic foot. For new gas or oil wells the utilization of wellhead gas has a rather low economic attractiveness because of the relatively low quantity of such gas with respect to the high value gas and liquid petroleum products directly produced from such new wells. As wells mature the utilization of wellhead gas is an increasingly important factor in the economic decision to continue gas and oil production.

Several attempts over the years have been made to harness the wellhead gas prior to its further upstream processing, generally by drawing a portion of the gas stream off of the fluid transfer lines to run internal combustion engines, or associated wellhead machinery. However, this is not an optimal solution as it decreases the profitability of the hydrocarbon production from the wellhead. Thus, while an attractive solution, the approaches to date have been unfulfilling.

The inventions disclosed and taught herein are directed to systems, methods and the associated apparatus to extract kinetic energy from the high pressure fluid flow of wellhead gases or fluids during their transfer process, without directly using any significant portion of the wellhead fluid, or modifying the wellhead fluid. Such kinetic energy may then be converted to work energy, which can then be used for a variety of applications, sent on to a power grid, or the like.

BRIEF SUMMARY OF THE INVENTION

The present disclosure provides unique systems and methodologies for using wellhead gas being produced at elevated (e.g., greater than about 100psi) fluid flow pressures to extract kinetic energy from the flow of the gas being produced without the need for combusting the gas or using an internal combustion engine, for the generation of electric power through the recovery of kinetic energy.

In accordance with a first embodiment of the present disclosure, a method for producing electricity by extraction of kinetic energy from a fluid flow stream is described, the method comprising subjecting a fluid being produced from a subterranean formation to a first pressure; routing the fluid into a vessel having a second pressure; directing the fluid through a machine that generates energy in response to the flow of the pressurized fluid; converting a force from the flow of the pressurized fluid into work energy by a work producing machine; and repeating the steps using the fluid as appropriate. In further accordance with this embodiment, the fluid may be a liquid or a gas. In yet another aspect of this embodiment, the work producing machine comprises one of a gas turbine, a steam turbine, a wind turbine, a Tesla turbine, a Stirling engine, a piston and camshaft, a hydroelectric turbine, and a water wheel.

In yet another embodiment of the present disclosure, a system for treating raw wellhead gas to recover liquefiable, pressurized hydrocarbons therefrom and for using the pressurized hydrocarbon fluid flow to drive an electric generator and produce electric power is described, the system comprising means for using raw wellhead gas at a pressure ranging from about 100psi to about 10,000psi or greater, including pressures up to and including 70,000psi or more; a pressure powered means for driving an electric generator for producing electric power; and, means for circulating the pressurized fluid through the pressure powered means capable of transferring the kinetic energy of the circulating fluid to the electric generator.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
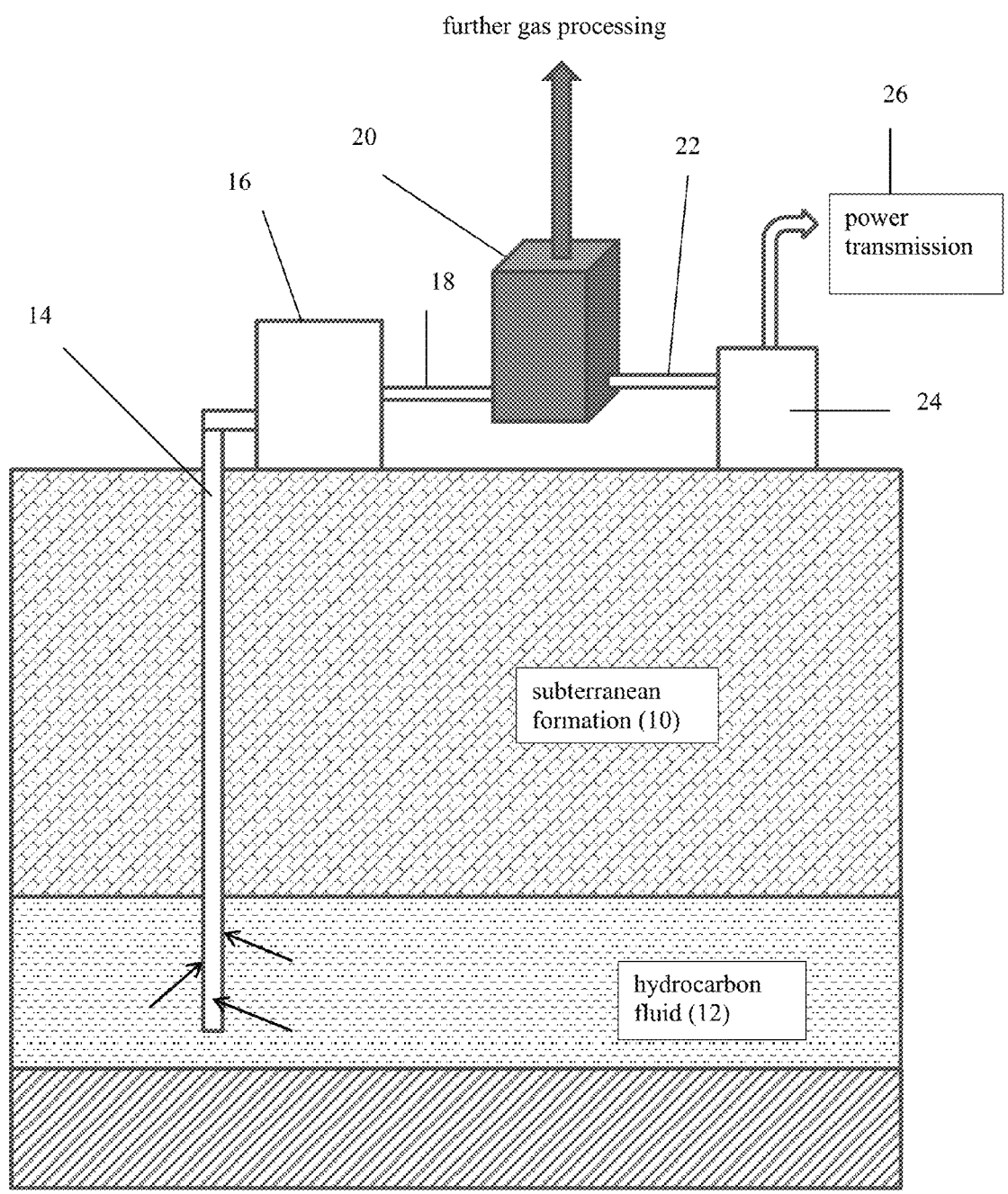
FIG. 1 illustrates a schematic illustration of generating power from pressurized gas being produced from a subterranean formation in accordance with aspects of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written is description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Applicant has created a novel, total flow energy production technology system that harnesses the kinetic energy in the total flow of pressurized gases and liquids discharged from a subterranean formation by a suitable prime mover, in order to generate mechanical power. Produced power may be used to drive the process by, for example, powering working fluid liquid pumps to pump liquid carbon dioxide to high pressure and/or gas compressors; to power other equipment; and to power electrical generators. Additionally, electrical power generated from the kinetic energy may be used onsite or sold to a local utility company.

Figure 3:
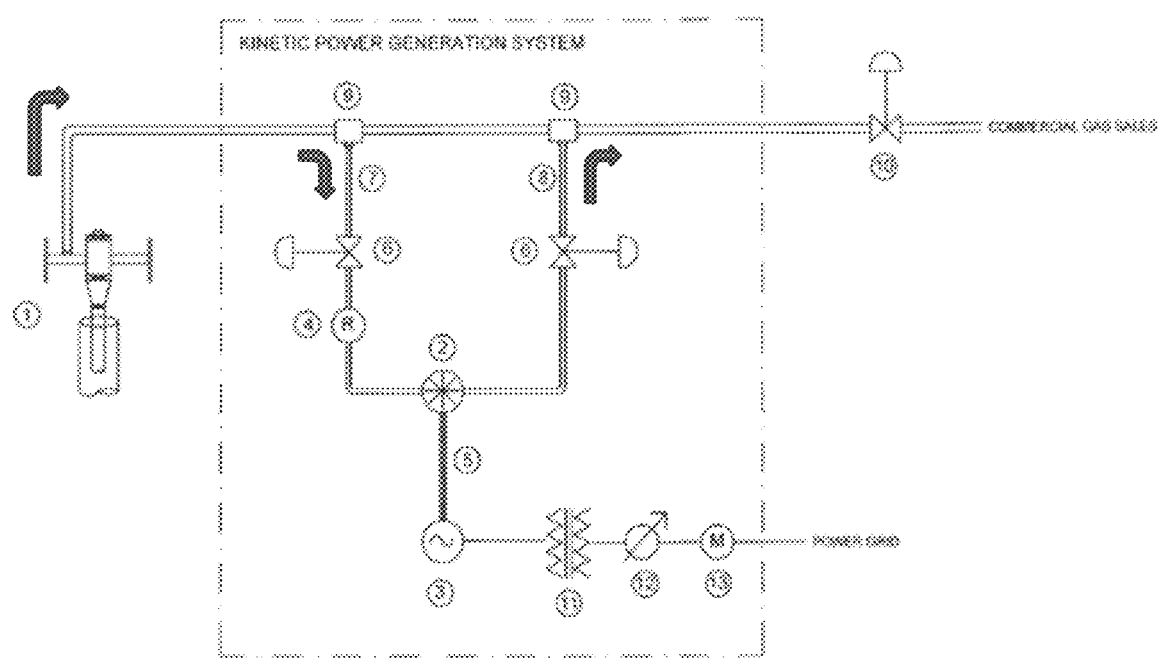
FIG. 3 illustrates a schematic flow chart of the system and process of the present disclosure.

Turning now to the figures, FIG. 1 is an illustration of the overall system and process of the present disclosure. A wellhead assembly 16 is connected via fluid piping 14 to a hydrocarbon fluid 12, such as a liquid or gaseous hydrocarbon, within a subterranean formation, for extraction of the hydrocarbon. In accordance with the systems of the present disclosure, fluid 12 leaves the earth via piping 14 or similar routing devices at a high rate of pressure, typically ranging from about 100psi to about 10,000psi or above, inclusive. High pressure regulators (such as shown in FIG. 3) direct the fluid via supply line 18 to a prime mover 20. As will be discussed in more detail later, such high pressure fluid may then be transferred via a secondary supply line 22 to a generator 24 via a kinetic energy transfer means (not shown), wherein the kinetic energy of the high pressure fluid is transferred to electrical energy via suitable electrical power transmission means 26. The pressurized fluid continues to flow through a system loop and return to the prime mover 20, wherein it may be piped for further gas processing or sales, or may be re-routed through one or more additional systems (100) so as to produce more energy, or continue to produce energy, depending on the fluid flow pressure. While not being limited by theory, it is believed that the Bernoulli effect or principle as related to fluid flow dynamics will aid in the regulation of the fluid flow through the system of the present disclosure, and aid in pulling the fluid diverted from the wellhead to extract energy back into the main fluid transfer pipeline 14. Advantageously, the process of generating kinetic energy in accordance with the present methods does not require, and specifically and advantageously excludes and is in the absence of, a process step of igniting any of the high-pressure fluids to drive a prime mover or assist in obtaining kinetic energy from the fluid flow system.

While the systems shown for purpose of illustration herein are directed to a system installed at or near a well head, the system need not be limited to such a location, and may also be installed as an in-line pipeline installation (such as a hydrocarbon fluid transmission pipeline), also referred to herein as "in-line". Alternatively, and equally acceptable, systems in accordance with the present disclosure may also include energy recovery systems both at or near the well head, as well as in one or more locations along the fluid transmission pipeline, as appropriate, and depending upon the fluid flow pressure (e.g., the higher the fluid flow pressure, the more systems may be installed).

With continued reference to FIG. 1, the system includes a prime mover 20, which preferably is any machine or mechanical device capable of turning or operating a generator to produce power or electricity. Exemplary prime movers 20 may comprise, for example and without limitation, an internal fuel injector engine, an electric, hydraulic, pneumatic motor, a pressure-powered motor, or a turbine assembly. In the embodiment illustrated in FIG. 1, the prime mover 20 is shown to be a pressure-powered machine assembly, such as a turbine. Advantageously, and preferably, the prime mover 20 suitable for use in accordance with the present disclosure does not burn or ignite any of the pressurized fluid which is being used to extract energy from the well head.

Figure 2:
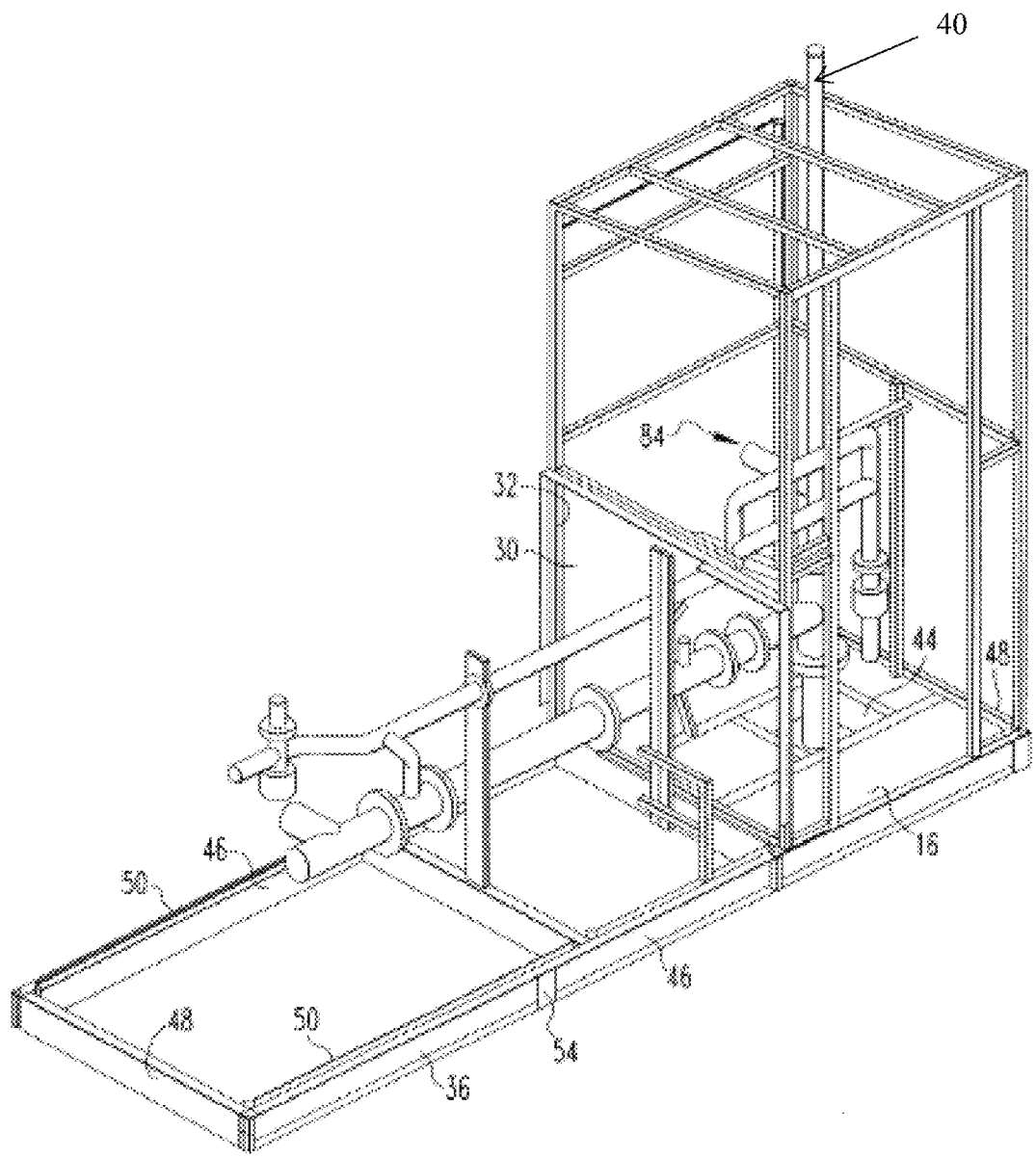
FIG. 2 illustrates an isometric view of an exemplary well head in association with the systems of the present disclosure.

FIG. 2 illustrates an exemplary well head assembly 16 in association with the present disclosure, wherein the enclosure for such assembly 16 is not shown for purposes of clarity. The wellhead 84 is typically surrounded by a structural enclosure having support struts 32, framing members 46, 48, and 50, optionally including vents 36, and a floor 15, the floor 15 defining an opening 44, dimensioned and configured to permit the piping 14 transferring fluids 12 from subterranean formation 10 to enter and exit the ground. Further piping 40 may direct the hydrocarbon fluid from the well head to a kinetic energy recovery system such as described herein.

FIG. 3 illustrates a general schematic of an illustrative, non-limiting embodiment of the present systems of the disclosure. As shown therein, a gas wellhead or other similarly pressurized pipeline source (1) is connected via fluid flow tubing to and through a kinetic power generation system (100) in accordance with the instant invention. As shown in the figure, pressurized fluid flowing from the pipeline source (1) may be routed through the kinetic power generation system 100 via one or more taps or valves (9), or may flow directly through the fluid transfer system to a commercial gas sale and commodity center upstream from the wellhead (1).

When the pressurized fluid is directed through the system 100, the fluid flow through a first directional valve (9) via a gas supply line (7), which may further include one or more additional valves, pressure regulators (4), and the like, to a kinetic gas turbine, engine, or prime mover (2). The prime mover 2 is operably connected via a connecting drive shaft (5) to an electric generator (3). As the pressurized fluid flows through the prime mover 2, drive shaft 5 is turned, transferring the kinetic energy of the pressurized, fast-moving fluid to electrical energy. The pressurized fluid, once leaving the prime mover 2, moves via return supply line (8) to the main supply line, wherein it may either a) routed through one or more additional systems so as to extract additional energy, or b) be directed via appropriate valving and fluid conveyance means to upstream processes.

Electrical energy produced from the fluid flow kinetic energy via the interaction of the prime mover 2 leaves electric generator 3 and is conveyed to a step-up transformer or the like, and then to one or more voltage regulators as appropriate. Thereafter, the energy can be sent to a power grid via electric power meter (13), or may be used to power apparatus at the wellhead or other well heads, including the wellhead itself, as well as associated pumps and equipment, or a separate drilling rig.

Other and further embodiments utilizing one or more aspects of the inventions described above can be devised without departing from the spirit of Applicant's invention. For example, the processes described herein can be used in association with geothermal energy recovery operations so as to develop and positively use the kinetic energy resulting from such recovery operations to generate useable energy. Further, the various methods and embodiments of the system and process can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of producing electricity, the method comprising:
   allowing a naturally-occurring wellhead gas from a subterranean formation to flow to the earth's surface at a pressure established by the subterranean formation;
   converting the flow of pressurized wellhead gas into rotary kinetic energy;
   thereafter routing at least a portion of the wellhead gas to a wellhead gas processing facility; and
   converting the rotary kinetic energy into electrical energy.

2. The method of claim 1, wherein converting the flow of pressurized wellhead gas is accomplished by a non-combusting machine.

3. The method of claim 2, wherein converting the rotary kinetic energy is accomplished with a stator and rotor for generating AC or DC electrical power.

4. The method of claim 2, wherein the machine is a non-combusting reciprocating piston engine.

5. The method of claim 1, wherein the pressure of the wellhead gas falls within a range from about 100 psi to about 10,000 psi or above.

6. The method of claim 5, further comprising providing a transmission line configured to receive fluid processed by the gas processing facility.

7. The method of claim 1, further comprising:
   providing a wellhead assembly at the earth's surface;
   routing the naturally-occurring wellhead gas through an assembly of at least one valve and at least one pressure regulator;
   providing a machine configured to convert a flow of the wellhead gas to rotary kinetic energy; and
   providing a generator configured to convert rotary kinetic energy into electrical energy.

8. The method of claim 1, further comprising selling at least a portion of the electrical energy to a utility or other entity.

9. The method of claim 1, further comprising using at least a portion of the electrical energy for activities related to producing hydrocarbons from the subterranean formation.

10. The method of claim 1, further comprising processing at least a portion of the wellhead gas used to generate rotary kinetic energy.

11. The method of claim 1, further comprising selling at least a portion of the processed wellhead gas.

12. The method of claim 1, further comprising routing at least a portion of the processed wellhead gas to a gas transmission line.

13. The method of claim 1, further comprising diverting at least a portion of the wellhead gas through a valve and a pressure regulator, and thereafter converting the flow of wellhead gas into rotary kinetic energy.

14. A method of producing electricity, the method comprising:
   allowing a naturally-occurring wellhead fluid from a subterranean formation to flow to the earth's surface at a pressure established by the subterranean formation;
   converting the flow of pressurized wellhead fluid into rotary kinetic energy;
   thereafter routing at least a portion of the wellhead fluid to a wellhead fluid processing facility;
   converting the rotary kinetic energy into electrical energy; and
   using at least a portion of the electrical energy for activities related to producing hydrocarbons from the subterranean formation.

15. The method of claim 14, further comprising diverting at least a portion of the wellhead fluid through a valve and a pressure regulator, and thereafter converting the flow of wellhead fluid into rotary kinetic energy.

16. The method of claim 15, wherein converting the flow of pressurized wellhead fluid is accomplished by a non-combusting machine.

17. The method of claim 16, wherein the machine is a non-combusting reciprocating piston engine.

18. The method of claim 17, wherein converting the rotary kinetic energy is accomplished with a stator and rotor for generating AC or DC electrical power.

19. The method of claim 14, wherein the pressure of the wellhead fluid falls within a range from about 100 psi to about 10,000 psi or above.

20. The method of claim 14, further comprising providing a fluid transmission line configured to receive fluid processed by the processing facility.

21. The method of claim 14 wherein the raw wellhead fluid comprises a liquid naturally occurring in the formation.

22. The method of claim 14 wherein the raw wellhead fluid comprises a gas naturally occurring in the formation.

23. The method of claim 22, further comprising:
   providing a wellhead assembly at the earth's surface;
   routing the naturally-occurring wellhead gas through an assembly of at least one valve and at least one pressure regulator;
   providing a machine configured to convert a flow of the wellhead gas to rotary kinetic energy; and
   providing a generator configured to convert rotary kinetic energy into electrical energy.

24. The method of claim 23, further comprising routing at least a portion of the processed wellhead gas to a gas transmission line.

25. The method of claim 14, further comprising selling at least a portion of the electrical energy to a utility or other entity.

26. The method of claim 14, further comprising processing at least a portion of the wellhead fluid used to generate rotary kinetic energy.

27. The method of claim 14, further comprising selling at least a portion of the processed wellhead fluid.

* * * * *